US012410638B2

(12) United States Patent
Wahmann

(10) Patent No.: US 12,410,638 B2
(45) Date of Patent: Sep. 9, 2025

(54) MOTOR VEHICLE LOCK, IN PARTICULAR MOTOR VEHICLE SIDE DOOR LOCK

(71) Applicant: Kiekert AG, Heiligenhaus (DE)

(72) Inventor: Hendrik Wahmann, Düsseldorf (DE)

(73) Assignee: Kiekert AG, Heiligenhaus (DE)

( * ) Notice: Subject to any disclaimer, the term of this patent is extended or adjusted under 35 U.S.C. 154(b) by 218 days.

(21) Appl. No.: 17/799,047

(22) PCT Filed: Feb. 25, 2021

(86) PCT No.: PCT/DE2021/100189
§ 371 (c)(1),
(2) Date: Aug. 29, 2022

(87) PCT Pub. No.: WO2021/175368
PCT Pub. Date: Sep. 10, 2021

(65) Prior Publication Data
US 2023/0065236 A1 Mar. 2, 2023

(30) Foreign Application Priority Data
Mar. 2, 2020 (DE) ..................... 10 2020 105 473.4

(51) Int. Cl.
*E05B 77/06* (2014.01)
*E05B 77/34* (2014.01)

(52) U.S. Cl.
CPC .............. *E05B 77/06* (2013.01); *E05B 77/34* (2013.01)

(58) Field of Classification Search
CPC ........... E05B 77/02; E05B 77/04; E05B 77/06
See application file for complete search history.

(56) References Cited

U.S. PATENT DOCUMENTS 11,519,201 B2 * 12/2022 Fuchs ..................... E05B 77/06
11,536,056 B2 * 12/2022 Fuchs ..................... E05B 77/06
2017/0114574 A1 * 4/2017 Topfer .................... E05B 77/06
2019/0078356 A1 * 3/2019 Reddmann .............. E05B 77/06
2020/0056404 A1 * 2/2020 Fuchs ..................... E05B 77/06

FOREIGN PATENT DOCUMENTS

DE 102014002581 A1 * 8/2015 ............. E05B 77/06
DE 102015001906 A1 8/2016
DE 102017102549 A1 8/2018
DE 102017102899 A1 8/2018
DE 102017127386 A1 5/2019
WO 2015090286 A1 6/2015

OTHER PUBLICATIONS

International Search Report mailed Jun. 9, 2021, for priority International Patent Application No. PCT/DE2021/100189.

* cited by examiner

*Primary Examiner* — Alyson M Merlino
(74) *Attorney, Agent, or Firm* — Renner, Otto, Boisselle & Sklar, LLP

(57) ABSTRACT

A motor vehicle lock, in particular a motor vehicle side door lock, which is equipped with a locking mechanism composed, essentially, of a rotary latch and a pawl. Also comprising an actuating lever for the locking mechanism and a release lever for the pawl. Both levers can be coupled and uncoupled to/from each other by means of a coupling lever. A mass inertia element which uncouples the coupling lever at least in the event of a crash is also provided. According to the invention, the clutch lever is actuated in normal operation at least slightly with respect to its bearing whenever the actuating lever is acted upon.

9 Claims, 3 Drawing Sheets

MOTOR VEHICLE LOCK, IN PARTICULAR MOTOR VEHICLE SIDE DOOR LOCK

This application is a national phase of International Patent Application No. PCT/DE2021/100189 filed Feb. 25, 2021, which claims priority to German Patent Application No. 10 2020 105 473.4 filed Mar. 2, 2020, each of which is hereby incorporated herein by reference in its entirety.

FIELD OF DISCLOSURE

The invention relates to a motor vehicle lock, in particular a motor vehicle side door lock, comprising a locking mechanism composed, essentially, of a rotary latch and a pawl, further comprising an actuating lever for the locking mechanism and a release lever for the pawl, wherein both levers, i.e., the actuating lever and the release lever, can be coupled and uncoupled to/from each other by means of a coupling lever, and comprising a mass inertia element which uncouples the coupling lever at least in the event of a crash.

BACKGROUND OF DISCLOSURE

Motor vehicle locks and in particular motor vehicle side door locks are increasingly using mass inertia elements in order to improve overall safety. With the help of these mass inertia elements, it is regularly prevented that—in the case of a motor vehicle side door lock and by way of example—the associated side door of a motor vehicle unintentionally opens in the event of a crash. Only in this case can safety devices located in or on the side door, such as side airbags, belt tensioners, etc., be fully effective in protecting the motor vehicle occupants.

For example, this corresponds to the procedure from the generic state of the art according to DE 10 2017 127 386 A1. In this case, the coupling lever is guided in a control cam of a control lever. The control lever is in turn engaged with a mass inertia element such that the control lever remains in its initial position when the mass inertia element comes to a standstill (in the event of a crash). The coupling lever is uncoupled by the control lever remaining in its initial position. In addition, it is provided that, when the actuating lever is actuated, the mass inertia element is acted upon at least in certain regions, specifically in normal operation, i.e., when the motor vehicle lock is functioning normally and no crash is occurring. The forced actuation of the mass inertia element realized within the scope of the known teaching results in said mass inertia element being constantly actively moved, and its safe functioning thus being ensured even over long periods of time. In fact, the forced movement of the mass inertia element in the known teaching ensures that the mass inertia element is not impeded in its functioning, for example by dirt, corrosion, etc.

A comparable and even closer state of the art is described in the applicant's DE 10 2017 102 549 A1. In this case, too, the release lever and the actuating lever can be coupled with the help of the coupling lever. In addition, means for controlling the coupling lever are implemented, with the coupling lever being guided with the help of a control cam. The control lever again interacts with a mass inertia element.

When the actuating lever is actuated in normal operation, the coupling lever is actuated. When the actuating lever is actuated at a normal speed, i.e., in normal operation, the control lever interacting with the mass inertia element follows the movement of the actuating lever. As a result, the coupling lever as a whole retains its orientation in an associated functional unit. This means that the coupling lever is moved in general but not relative to the functional unit. As a result of this, there is a risk, in particular over long periods of time or under adverse environmental conditions, that the coupling lever, which in the known teaching is pivotably mounted on the actuating lever, will be impaired in its functioning. In the event of a crash in particular, this may have negative effects such that the coupling lever guided with the help of the control lever is not uncoupled or is not reliably uncoupled in the event of a crash. As a result, there is the possibility that, in the event of a crash, the actuating lever and the release lever are not separated from each other or not completely separated from each other by means of the coupling lever. The invention as a whole seeks to remedy this.

SUMMARY OF DISCLOSURE

The invention is based on the technical problem of further developing such a motor vehicle lock and in particular a motor vehicle side door lock such that the functional reliability is improved again compared to the state of the art, in particular in the event of a crash.

To solve this technical problem, a generic motor vehicle lock is characterized within the scope of the invention in that the coupling lever is actuated in normal operation at least slightly with respect to its bearing whenever the actuating lever is acted upon.

Within the scope of the invention and in contrast to the state of the art, in particular according to DE 10 2017 102 549 A1, the coupling lever is therefore not (only) generally moved jointly with the actuating lever in normal operation. In fact, according to an advantageous embodiment, the coupling lever is mounted on top of or on the actuating lever in question. Instead, according to the invention, this joint movement of the actuating lever and the coupling lever for acting upon the release lever in normal operation is additionally overlaid by a forced movement, so to speak, of the coupling lever whenever the actuating lever is acted upon. This additional forced movement of the coupling lever results in the coupling lever in question being actuated at least slightly with respect to its bearing. This means that the coupling lever is pivoted at least slightly in its bearing as a result of this additional forced movement.

Since the coupling lever is usually mounted on top of or on the actuating lever, the forced movement described automatically means that the coupling lever is not only moved jointly with the actuating lever in normal operation, but, in its bearing on top of or on the actuating lever, is also subjected to additional relative movement or bearing movement and thus to a movement relative to the actuator.

In this way, the invention ensures that, according to an advantageous embodiment, the bearing of the coupling lever maintains its reliable functioning relative to the actuating lever even over long periods of time. As a result, any contamination, corrosion, etc. are counteracted, which at this point result or can result in the coupling lever seizing in its bearing on the actuating lever, for example. According to the invention, this "seizing" of the coupling lever relative to the actuating lever or relative to its bearing is countered by the coupling lever completing a relative movement with respect to its bearing in normal operation. As a result, functional reliability is once again significantly improved.

In this case, the invention is based on the knowledge that a concomitant movement of the mass inertia element, as in the state of the art, is not absolutely or not necessarily required for every normal movement or in normal operation. Rather, it is important for safe functioning, in particular in the event of a crash, that the coupling lever is reliably uncoupled with respect to the actuating lever and release lever. According to the invention, this proper uncoupling is guaranteed and ensured by the coupling lever being moved or pivoted in normal operation at least slightly with respect to its bearing whenever the actuating lever is acted upon. This significantly improves overall safety, because it is ensured that the coupling lever is properly uncoupled even over long periods of time and under adverse environmental conditions in the event of a crash, thus separating the mechanical connection between the actuating lever for the locking mechanism and the release lever for the pawl.

As a result of this, any deflections of the actuating lever caused by a crash are not (or are no longer) transferred to the release lever such that the locking mechanism is opened. Rather, the locking mechanism reliably retains its closed position even in the event of a crash, so that the associated motor vehicle side door in the example considered cannot open unintentionally.

According to an advantageous embodiment, the release lever is equipped with a control contour for actuating the coupling lever in normal operation. The invention is based on the knowledge that at least one end of the coupling lever abuts against the control contour in question of the release lever. When the actuating lever is actuated in normal operation, the control contour now ensures that the coupling lever still couples the actuating lever to the release lever in an unchanged manner, in order to regularly lift the pawl from its engaged position with the rotary latch. In addition and according to the invention, however, the control contour on the release lever interacting with the coupling lever in this case ensures that the coupling lever is actuated in normal operation, namely that it performs the at least slight pivoting movement already mentioned with respect to its bearing.

According to a further advantageous embodiment, the control contour in question on the release lever transitions into a stop for the coupling lever in the actuating direction of the actuating lever in normal operation. This means that, when the actuating lever is acted upon, the shaft-remote end of the coupling lever usually abuts against the control contour and is pivoted with the help of the control contour with respect to its bearing on top of or on the actuating lever. At the same time, the acting upon of the actuating lever in the actuating direction and in normal operation ensures that the coupling lever transitions so as to abut against the stop after abutting against the control contour. As a result, the coupling lever moves against the stop, and the quasi-rigid connection that is desired in normal operation is established and provided between the actuating lever and the release lever via the coupled coupling lever.

The previously mentioned control contour is usually arranged in the region of a clearance between the actuating lever and the release lever. The clearance in question can advantageously be adjusted during a lock assembly. In other words, a certain clearance between the actuating lever and the release lever is set in the course of assembly of the motor vehicle lock according to the invention. This clearance ensures that, when the actuating lever is acted upon in normal operation, the shaft-remote end of the coupling lever can interact first with the control contour and then with the stop for the coupling lever. This results in the previously mentioned forced guidance of the coupling lever in normal operation, which forced guidance results in the coupling lever performing the aforementioned relative movement in its bearing relative to the actuating lever.

The coupling lever also interacts advantageously with a control lever. The control lever is in turn engaged with the previously mentioned mass inertia element. In addition, the control lever advantageously has a guide curve for the coupling lever. The procedure is usually such that a guide pin of the coupling lever engages with the previously mentioned guide curve of the control lever. Finally, the design is also such that the control lever is guided in a control contour of the mass inertia element.

In this way, in the event of a crash, the mass inertia element ensures that the coupling lever is transferred to its uncoupled position via the control lever and via the guide curve in the control lever in the event of said crash. This is generally known and will be explained in more detail below and with reference to the exemplary embodiment. In any case, the mass inertia element ensures that, in the event of a crash, the coupling lever is pivoted relative to the actuating lever such that the shaft-remote end of the coupling lever cannot (any longer) hit the stop on the release lever in the event of a crash. As a result, in the event of a crash, the mechanical connection between the actuating lever and the release lever is interrupted, as desired, because the coupling lever has assumed its uncoupled position. This is ensured by the mass inertia element via the control lever. As a result of this, any deflections of the actuating lever caused by a crash cannot be transferred to the release lever for acting upon the locking mechanism.

As a result, the locking mechanism remains in its closed state, also and in particular in the event of a crash. A locking pin previously captured with the help of the locking mechanism and connected to a motor vehicle side door, for example, remains in its captive position in the locking mechanism. The associated motor vehicle side door remains closed so that the vehicle occupants are optimally protected in the event of a crash.

All of this is achieved with a structurally simple and functionally reliable structure. Because, the invention ensures that the coupling lever performs a relative movement with respect to its bearing with each normal actuation. As a result, any seizing of the bearing cannot (or no longer) occur, even over long periods of time and with environmental conditions. Functional reliability is therefore enormously improved. Herein lie the essential advantages.

BRIEF DESCRIPTION OF DRAWINGS

The invention is explained in greater detail below with reference to drawings which show only one exemplary embodiment. In the drawings.

DETAILED DESCRIPTION

Figure 1:
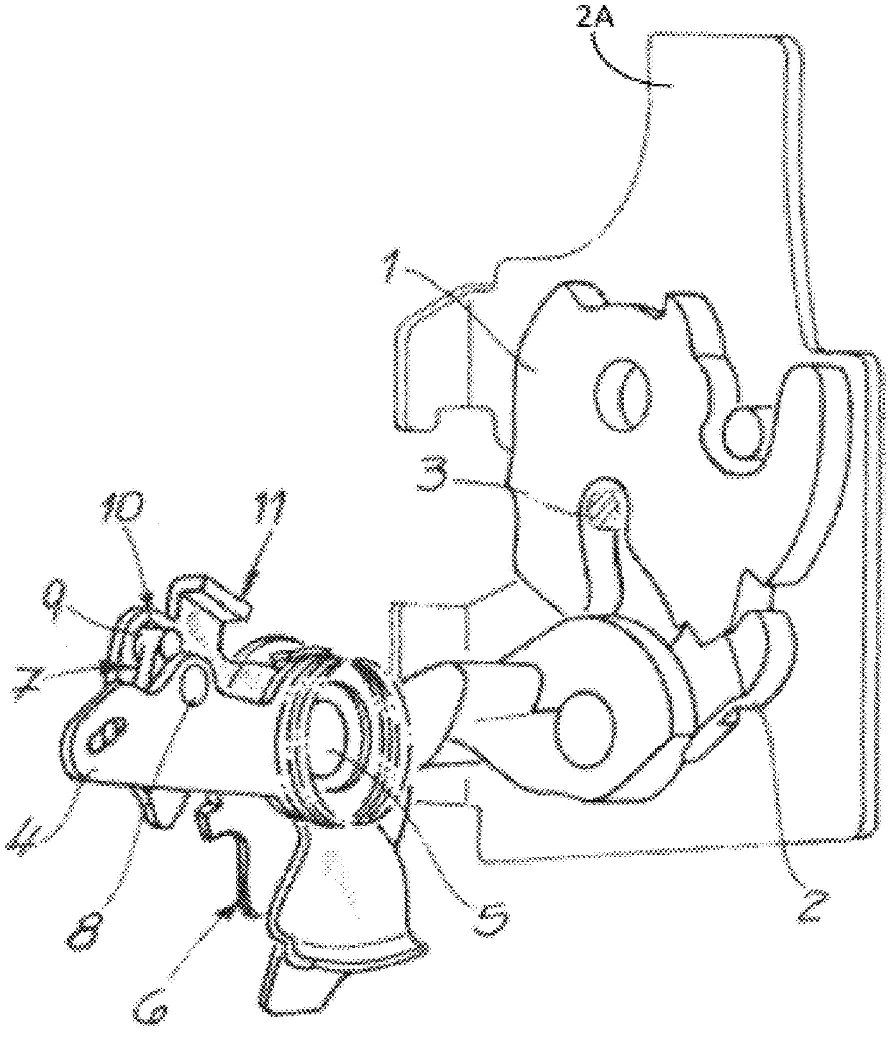
FIG. 1 is an overview of the motor vehicle lock according to the invention in normal operation.

FIG. 1 shows a motor vehicle lock which, within the scope of the exemplary embodiment, is a motor vehicle side door lock. In its basic structure, said latch has a locking mechanism 1, 2 consisting essentially of a rotary latch 1 and a pawl 2. It can be seen that the locking mechanism 1, 2 or the rotary latch 1 and also the pawl 2 are each mounted jointly in a lock case 2A shown only in FIG. 1. With the help of the locking mechanism 1, 2, a locking pin 3 (only indicated in FIG. 1) is captured, which in the exemplary embodiment is connected to a motor vehicle side door (not shown in detail).

The basic structure also includes an actuating lever 4 for the locking mechanism 1, 2, which, according to the exemplary embodiment, is an external actuating lever. For this purpose, the actuating lever 4 or external actuating lever is connected to an external actuating lever chain, which may terminate, for example, in an external door handle. Opening movements of the locking mechanism 1, 2 now result in the actuating lever 4 or external actuating lever being acted upon about its shaft 5 in normal operation in the clockwise direction indicated in FIG. 2. It is necessary for the actuating lever 4 to act upon a release lever 6 for the locking mechanism 1, 2, so that the locking mechanism 1, 2 can be opened during this process.

For this purpose, the release lever 6 is mounted on the same shaft as the actuating lever 4 on the common shaft 5. In addition, the release lever 6 has an actuating contour 6*a*, which is moved upward as shown in the opening movement described and in FIG. 2. As a result, the pawl 2 in the closed position is lifted directly or indirectly from its engagement with the rotary latch 1. As a result of this, the previously captured locking pin 3 is released. The associated motor vehicle side door (not shown) that is connected to the locking pin 3 can be opened in the example.

Figure 2:
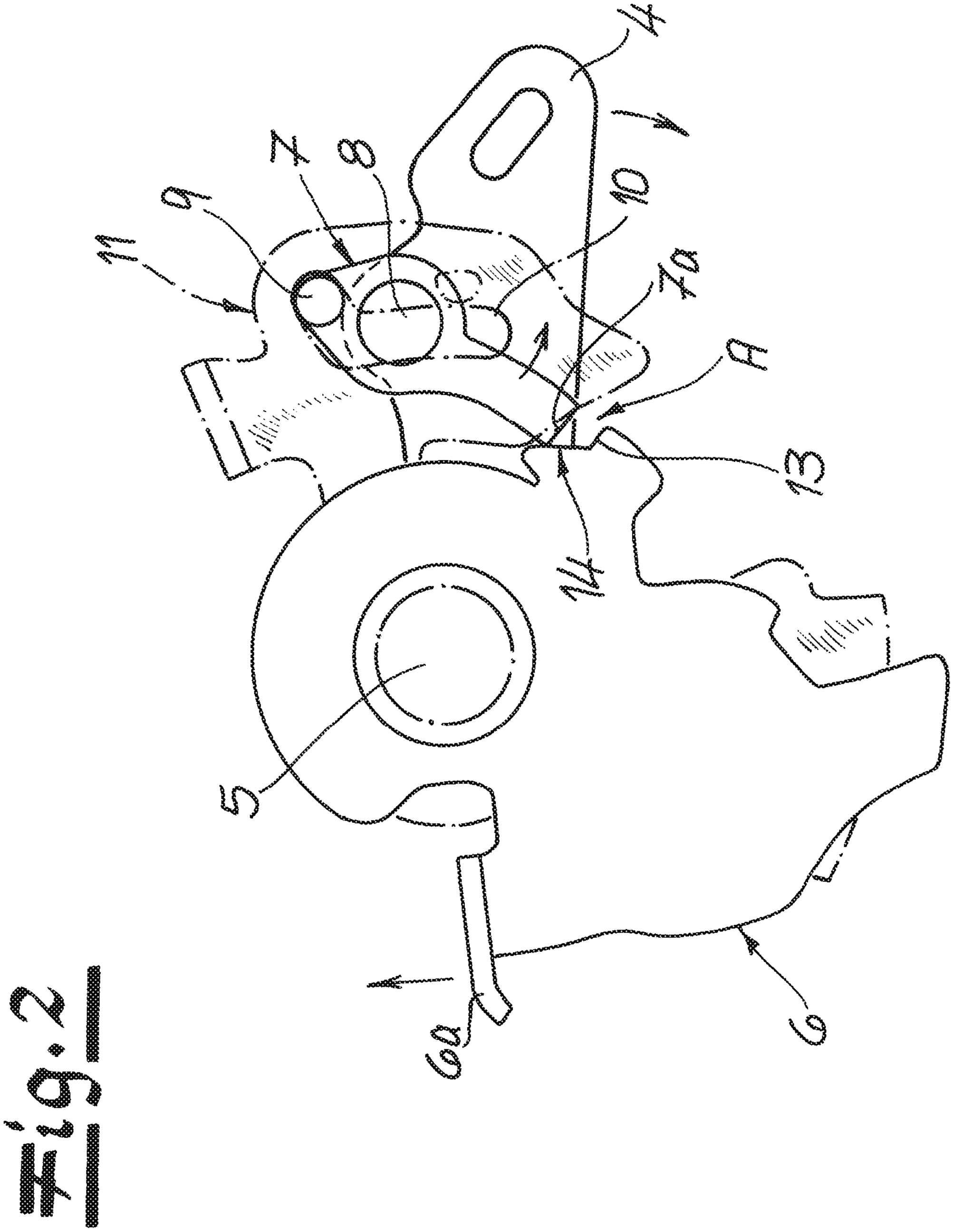
FIG. 2 shows the object according to FIG. 1 in detail in normal operation.

In the example, a coupling lever 7 provides the mechanical connection between the actuating lever 4 and the release lever 6. In fact, the two levers 4, 6 can be coupled and uncoupled to/from each other by the coupling lever 7 in question. The coupled state is shown in FIG. 2, whereas, in the crash situation according to FIG. 3, the coupling lever 7 has assumed its uncoupled position.

It can be seen that the coupling lever 7 is mounted on top of or on the actuating lever 4. For this purpose, the coupling lever 7 has a shaft 8. In addition, the coupling lever 7 is equipped with a guide pin 9. The coupling lever 7 engages with a guide curve 10 via the guide pin 9. The guide curve 10 is located in a control lever 11. The control lever 11 is mounted on the same shaft as the actuating lever 4 and release lever 6 in the common shaft 5.

Figure 3:
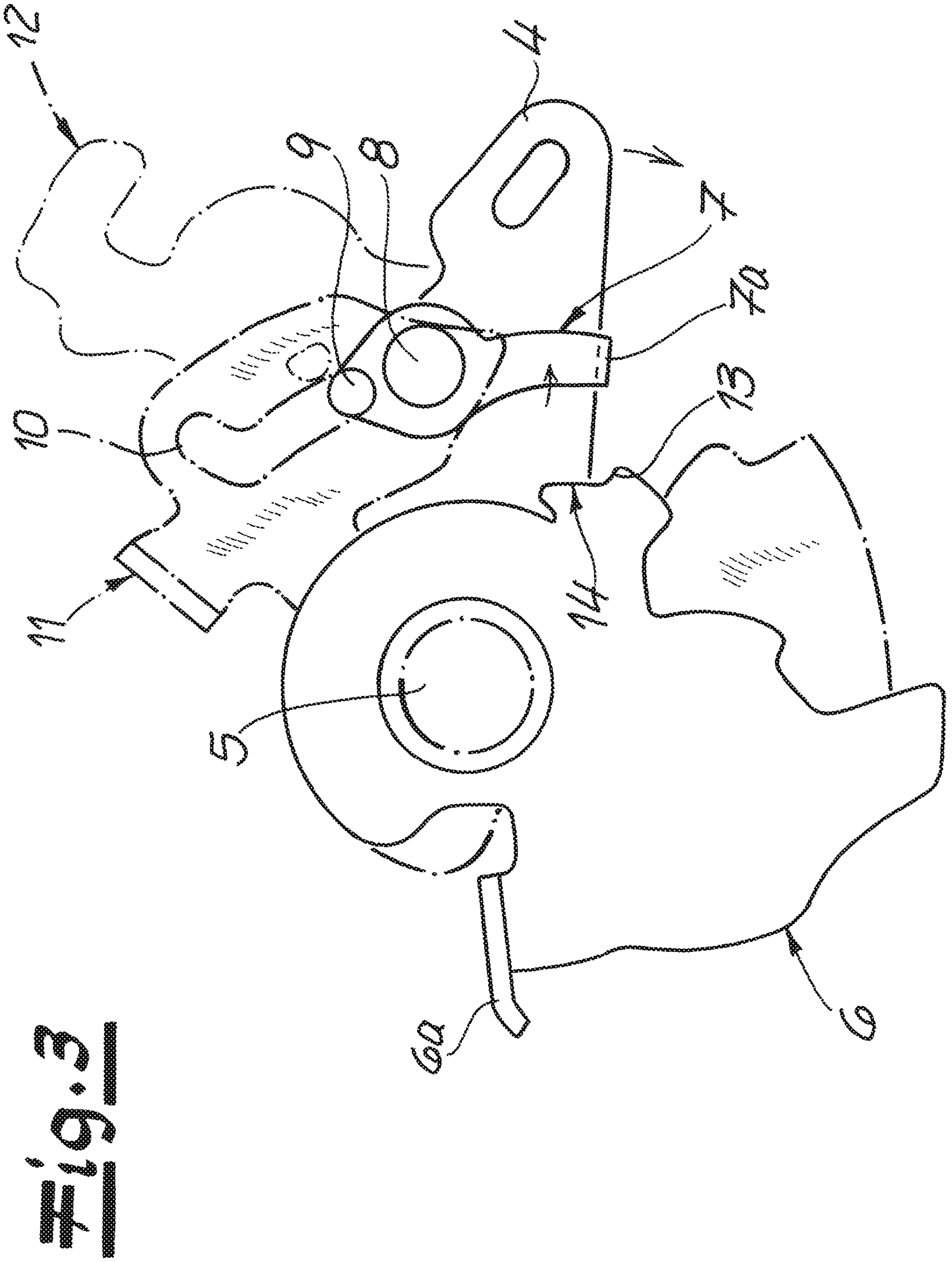
FIG. 3 shows the object according to FIG. 2 in the event of a crash.

The control lever 11 interacts not only with the coupling lever 7, because the guide pin 9 of the coupling lever 7 engages with the guide curve 10 of the control lever 11. But rather, the design is also such that the control lever 11 also interacts with a mass inertia element 12 that is only indicated in FIG. 3. For this purpose, the control lever 11 engages with a control contour of the mass inertia element 12 that is not shown in detail. The mass inertia element 12 ensures—as shown in FIG. 3 to be described in more detail below, and in the event of a crash—that the coupling lever 7 is uncoupled.

In normal operation, the shaft-remote end 7*a* of the coupling lever 7 moves against a stop 13 on the release lever 6. As soon as the shaft-remote end 7*a* of the coupling lever 7 abuts against the stop 13 of the release lever 6, the actuating lever 4 and the release lever 6 are connected to each other in a quasi-rigid manner via the coupling lever 7, so that the opening movement of the actuating lever 4 shown in FIG. 2 is transferred clockwise directly to the release lever 6. As a result of this, the release lever 6 moves upward with its actuating contour 6*a* and then ensures, as desired, that the pawl 2 is lifted from its engagement with the rotary latch 1. The associated motor vehicle lock is opened.

Before the shaft-remote end of the coupling lever 7 reaches the stop 13 in question on the release lever 6, the coupling lever 7 also performs a relative movement in its bearing 8. Because, when the actuating lever 4 is acted upon in a clockwise direction corresponding to normal operation according to FIG. 2, the shaft-remote end 7*a* of the coupling lever 7 moves along a control contour 14 on the release lever 6. As a result, the coupling lever 7 is actively actuated in normal operation at least slightly with respect to its bearing 8 whenever the actuating lever 4 is acted upon, namely pivoted counterclockwise about its shaft 8. This means that the control contour 14 ensures that the coupling lever 7 in the exemplary embodiment and according to the illustration in FIG. 2 is pivoted slightly counterclockwise with respect to its bearing 8. As a result, the control lever 11 and with it the mass inertia element 12 also experience a slight pivoting movement, so that any malfunctions are effectively counteracted in this way.

Overall, however, the design is such that the control contour 14 transitions into the stop 13 in question for the coupling lever 7 in the clockwise actuating direction of the actuating lever 4 and in normal operation. In addition, the design is such that the control contour 14 in question is arranged in the region of a clearance A between the actuating lever 4 and the release lever 6. This clearance A between the two levers 4, 6 can be adjusted, for example, during a lock assembly.

The mode of operation is as follows. In normal operation according to FIG. 2, the previously mentioned clockwise actuation of the actuating lever 4 ensures that the coupling lever 7 first slides along the control contour 14 with its shaft-remote end 7*a* and then reaches the stop 13 on the release lever 6. Following this, both levers 4, 6 are coupled to each other in a quasi-rigid manner, so that—as described—the clockwise movement of the actuating lever 4 causes the pawl 2 to be lifted from its engagement with the rotary latch 1, 2. The associated motor vehicle lock is opened.

In the event of a crash according to FIG. 3, however, the mass inertia element 12 now ensures that the coupling lever 7 is uncoupled. Because, in the event of a crash, the mass inertia element 12 ensures via the control lever 11 that the guide pin 9 of the coupling lever 7 is moved along the guide curve 10, and the result is that the coupling lever 7 is pivoted counterclockwise about its shaft 8. In this context, the control lever 11 is pivoted counterclockwise about its shaft 5, starting from FIG. 2. As a result, the coupling lever 7 is disengaged from the stop 13 of the release lever 6, so that the coupling lever 7 is uncoupled overall. If, in this functional state, the actuating lever 4 is acted upon in a clockwise opening direction as a result of a crash, this movement of the actuating lever 4 is not transferred to the release lever 6.

Rather, the release lever 6 remains at rest and cannot act on the locking mechanism 1, 2. Consequently, the locking mechanism 1, 2 also remains in its initial position, which then also applies to the motor vehicle side door and its locking pin 3 captured in the locking mechanism 1, 2.

LIST OF REFERENCE SIGNS

1 Catch
2 Pawl
3 Locking pin
4 Actuating lever
5 Shaft
6 Release lever
6*a* Actuating contour
7 Coupling lever
7*a* Shaft-remote end
8 Shaft
9 Guide pin
10 Guide curve
11 Control lever

12 Mass inertia element
13 Stop
14 Control contour

The invention claimed is:

1. A motor vehicle lock comprising:

a locking mechanism including a rotary latch and a pawl, an actuating lever for the locking mechanism and a release lever for the pawl, wherein the release lever includes an actuating contour, wherein the actuating lever acts on the release lever to release the pawl via engagement of the actuating contour on the release lever and the pawl, a coupling lever having a bearing, wherein the actuating lever and the release lever are coupled and uncoupled to/from each other by the coupling lever, wherein the bearing is directly on the actuating lever such that the coupling lever is directly and movably mounted on the actuating lever, and a mass inertia element which uncouples the coupling lever in the event of a crash, wherein the coupling lever is pivoted in a normal operation with respect to the bearing as the coupling lever travels along a control contour of the release lever whenever the actuating lever is acted upon.

2. The motor vehicle lock according to claim 1, wherein the control contour transitions into a stop for the coupling lever in an actuating direction of the actuating lever in the normal operation.

3. The motor vehicle lock according to claim 1, wherein the control contour is arranged in a region of a clearance between the actuating lever and the release lever.

4. The motor vehicle lock according to claim 3, wherein the clearance is adjusted during assembly of the motor vehicle lock.

5. The motor vehicle lock according to claim 1, further comprising a control lever, wherein the control lever interacts with the coupling lever and is engaged with the mass inertia element.

6. The motor vehicle lock according to claim 5, wherein the control lever has a guide curve for interacting with the coupling lever.

7. The motor vehicle lock according to claim 6, wherein the coupling lever includes a guide pin that engages with the guide curve.

8. The motor vehicle lock according to claim 1, wherein the actuating lever and the release lever are movably mounted on a common shaft.

9. The motor vehicle lock according to claim 5, wherein the control lever, the actuating lever, and the release lever are movably mounted on a common shaft.

* * * * *